US007093285B2

(12) United States Patent
Singhani et al.

(10) Patent No.: US 7,093,285 B2
(45) Date of Patent: Aug. 15, 2006

(54) SUPPLIER PORTAL FOR GLOBAL PROCUREMENT E-BUSINESS APPLICATIONS

(75) Inventors: Anil K. Singhani, Poughkeepsie, NY (US); David R. Barletta, Hopewell Junction, NY (US); Sachin S. Chandra, Fishkill, NY (US); Akber A. Choudhry, Woodbridge (CA); Gordon Fry, New Windsor, NY (US); Patrice N. Knight, Beacon, NY (US); Lorana K. Lo, Wappingers Falls, NY (US); Karim Nasiruddin, Wappingers Falls, NY (US); John P. O'Connor, Cupertino, CA (US); Tarun K. Saha, Beacon, NY (US); Andrew Strickland, New York, NY (US); Lou Zhou, Smithtown, NY (US)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 09/773,337

(22) Filed: Jan. 31, 2001

(65) Prior Publication Data
US 2002/0104018 A1    Aug. 1, 2002

(51) Int. Cl.
*H04L 9/32* (2006.01)
(52) U.S. Cl. .......................... 726/8; 705/35
(58) Field of Classification Search ................. 713/202
See application file for complete search history.

(56) References Cited

U.S. PATENT DOCUMENTS

| 5,793,964 | A |   | 8/1998 | Rogers et al. |
|---|---|---|---|---|
| 5,870,717 | A |   | 2/1999 | Wiecha |
| 5,974,441 | A |   | 10/1999 | Rogers et al. |
| 6,032,130 | A |   | 2/2000 | Alloul et al. |
| 6,049,787 | A |   | 4/2000 | Takahashi et al. |
| 6,606,606 | B1 | * | 8/2003 | Starr ........................... 705/35 |
| 6,611,275 | B1 | * | 8/2003 | Zey et al. .................... 715/752 |

FOREIGN PATENT DOCUMENTS

EP          0 927 945 A2      7/1999

OTHER PUBLICATIONS

Murawski, Rob, Centralized directory services and accounts management project, Oct. 2000, ACM Press, Proceedings of the 28th annual ACM SIGUCCS conference on User services: Building the future.*

* cited by examiner

*Primary Examiner*—Kim Vu
*Assistant Examiner*—Brandon Hoffman
(74) *Attorney, Agent, or Firm*—Witham, Curtis, Christofferson & Cook, PC; James J. Cioffi (57) ABSTRACT

A process and system for managing business, technical and operational data uses a single interface in a shared space environment over the Internet, including a common authentication and environment. A supplier portal creates a central repository for registration process information, company information, and user information, making this information available to all applications that open into the supplier portal.

6 Claims, 5 Drawing Sheets

SUPPLIER PORTAL FOR GLOBAL PROCUREMENT E-BUSINESS APPLICATIONS

BACKGROUND OF THE INVENTION

1. Field of the Invention

The present invention generally relates to a supplier portal to assist in global procurement in an electronic business (e-business) environment and, more particularly, to a single point of contact for all electronic procurement (e-procurement) applications using a database to entitle users to access restricted applications available from the portal. The portal provides establishing a very flexible registration process customizable for each application; e.g., defining 1 to n level approval cycles, defining application specific registration fields, authorizing new tasks to a role, etc.

2. Background Description

In the past, global procurement users had to keep track of a different user identification (userid), password and universal resource locator (URL) for each of the global procurement applications they used. The process of managing business, technical and operational data became burdensome because of the many redundancies and different user interfaces required in accessing procurement applications.

SUMMARY OF THE INVENTION

It is therefore an object of the present invention to provide a way for users to access all e-business applications through a specialized site which streamlines registration processes by eliminating redundancies and speeding application use through a single user login and consistent user interface.

According to the invention, there is provided a supplier portal that is a single pont of entry for suppliers to access all strategic procurement applications. The suppliers use a single userid/password to access all the applications, and the userid/password can be obtained from a registration site.

The registration site is an application which must be used by a Web user (customer, supplier, business partner) to access any internet/extranet application. The registration site supports Lightweight Directory Access Protocol (LDAP) for authentication. Once registered on the registration site, the Web user can either access an application available in the open access area of the supplier portal or can submit a request to access applications that are available in the controlled section of the supplier portal.

A customized application specific registration form is presented to the user for input when access to an application is desired. The request for access to a controlled application is routed to the appropriate application administrator(s)/guest coordinator for approval. Once approved, the user and/or supplier profile will be stored in the Portal Common Registration (PCR) data store and the user notified of the approval to access the application. On subsequent login to the supplier portal, the user will see a customized supplier portal page with links to the open access area applications and controlled applications the user has been authorized to access by application administrators. Individual applications, however, will control the entitlement to the applications; i.e., what a user can and can not do in the application. An application may choose to administer the entitlement variables within the application itself or use the PCR data store to capture those variables and keep its local variable set synchronized with the PCR data store.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Portal Common Registration (PCR)

Every user, a guest company user or a host company user will be assigned a role level. The role level determines the tasks a user is authorized to perform. When the user logs in to the Portal, a customized page predicated on the user's role level is displayed listing the tasks user can perform. The flexible architecture of the Portal DB2 DataStore will allow the Portal administrator to easily add/delete tasks to a user role without affecting the PCR design. Initially, the following user roles and their respective tasks are defined in the Portal DB2 DataStore:

Portal-Administrator (host company)
Add new organization profile (host or guest company)
Change an existing organization profile
Add a now application profile
Change an existing application profile
Request access to an application on a user's behalf
Define new tasks
Define new user role levels
Assign tasks to role levels
Define application access approval cycle
Update basic user profile data, e.g., name, phone number, e-mail address, etc.

Application Administrator (host company)
Request access to an application on a user's behalf
Approve application access request from a host/guest company user
Approve "supplier coordinator"
Update basic user profile data, e.g., name, phone number, e-mail address, etc.

Supplier Coordinator (guest company)
Request access to an application on a user's behalf
Approve application access request from a guest company user
Update basic user profile data, e.g., name, phone number, e-mail address, etc.

General User (host/guest company)
Request access to an application
Update basic user profile data, e.g., name, phone number, e-mail address, etc.

Only a registered user can access a controlled application. However, a user can only be registered if the company and the supplier coordinator from that user's company has already been registered at the Portal. It is required that there be at least one supplier coordinator registered on the Portal for each supplier, The Portal architecture, however, will allow registration of multiple supplier coordinators from a single supplier. The application registration process for a supplier coordinator is slightly different from the registration process for supplier user. These are described in detail in the following sections.

Figure 1:
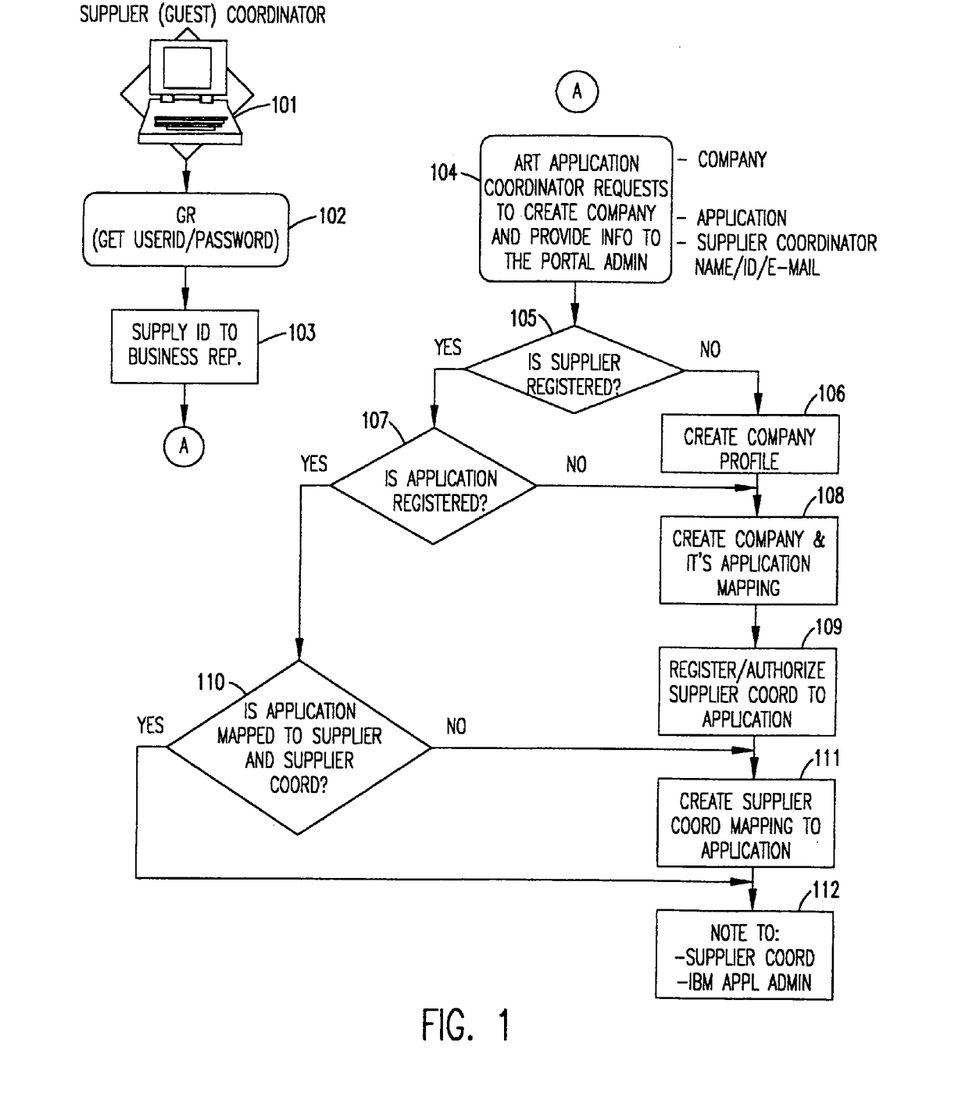
FIG. 1 is a flow diagram illustrating the supplier coordinator registration process.

The Supplier (Guest company) Coordinator Registration is shown in FIG. 1. The request to register the supplier coordinator may come from the host company application administrator, the requester or pre-registered supplier coordinator. The following are the three scenarios for supplier coordinator registration.

The supplier coordinator registration request from application administrator process will mostly be used when the company is not already registered. The supplier coordinator will acquire a userid/password from the Registration site and provide the appropriate information to the application administrator. The application administrator will provide necessary information about the supplier coordinator on the Portal, e.g., the supplier coordinates userid (obtained from the Registration home page), e-mail address, the company name, the name of the application that the supplier coordinator requires access to, etc. The Portal administrator will perform the following tasks using the PCR user interface to register the supplier coordinator:
  i. Set up a new company in the DataStore if the supplier coordinator belongs to a company whose profile does not yet exist.
  ii. Upgrade the user's role level to "supplier coordinator".
  iii. Set up the authorization for the supplier coordinator to access the application.
  iv. An automatic e-mail will be sent to the supplier coordinator and application administrator.

When a registration request from the supplier coordinator is received, the supplier coordinator will acquire a userid/password from the Registration site and will use the PCR user interface to request access for an application. The supplier coordinator needs to provide the necessary information, e.g., his/her userid (obtained from the Registration home page), the company name, the name of the application the supplier coordinator needs access to, etc., on the Portal.

The request will be forwarded to the application administrator for approval. The application administrator will verify the supplier coordinator information and provide the company name to the Portal administrator. The Portal administrator/host company application administrator will perform the following tasks using the PCR user interface to register the supplier coordinator:
  1. Set up a new company in the DataStore if the supplier coordinator belongs to a company whose profile does not yet exist (portal administrator only).
  2. Upgrade the user's role level to "supplier coordinator" (portal administrator or application administrator).
  3. Set up the authorization for the supplier coordinator to access the application (portal administrator or application administrator).
  4. An automatic e-mail will be sent to the supplier coordinator and application administrator.

FIG. 1 shows the flow of the supplier coordinator registration process. A request is received from a supplier (guest) coordinator at 101 and, in response to that request, the userid/password obtained at 102. The userid/password is supplied to the business representative at 103. A application coordinator requests to create company and provide information to the Portal administrator at 104. This information includes the company name, application, and supplier coordinator name, userid, e-mail, etc. A determination is made in decision block 105 as to whether the supplier is registered, if not then a company profile is created in function block 106. If the supplier is registered, a further determination is made in decision block 107 as to whether the application is registered. If not, then a company and its mapping is created in function block 108. Then, in function block 109, the supplier coordinator is registered and authorized to use the application. If the application is registered as determined in decision block 107, a further determination is made in decision block 110 as to whether the application is mapped to the supplier and supplier coordinator. If not, the supplier coordinator mapping to the application is crated in function block 111. Finally, an e-mail not is sent to the supplier coordinator application administrator in function block 112.

Supplier User Registration

The request to register the supplier user may either come from the supplier user or the supplier coordinator. The following are the two scenarios for supplier user registration.

In the first scenario, a user Registration request is received from the supplier coordinator. The supplier user will acquire a userid/password from the Registration site and provide the necessary information to his/her company's supplier coordinator.

The supplier coordinator will use the PCR user interface to request access to an application on the users behalf. The supplier coordinator will provide the necessary information, e.g., the user's userid (obtained from the Registration home page), the company name, the access level, the name of the application the user requires access to, etc. The request will be forwarded to the application administrator, if necessary. The application administrator will perform the following tasks using the PCR user interface to register the supplier user:
  1. Set up the authorization for the supplier user to access the application.
  2. An automatic e-mail will be sent to the supplier user and supplier coordinator.

Figure 2:
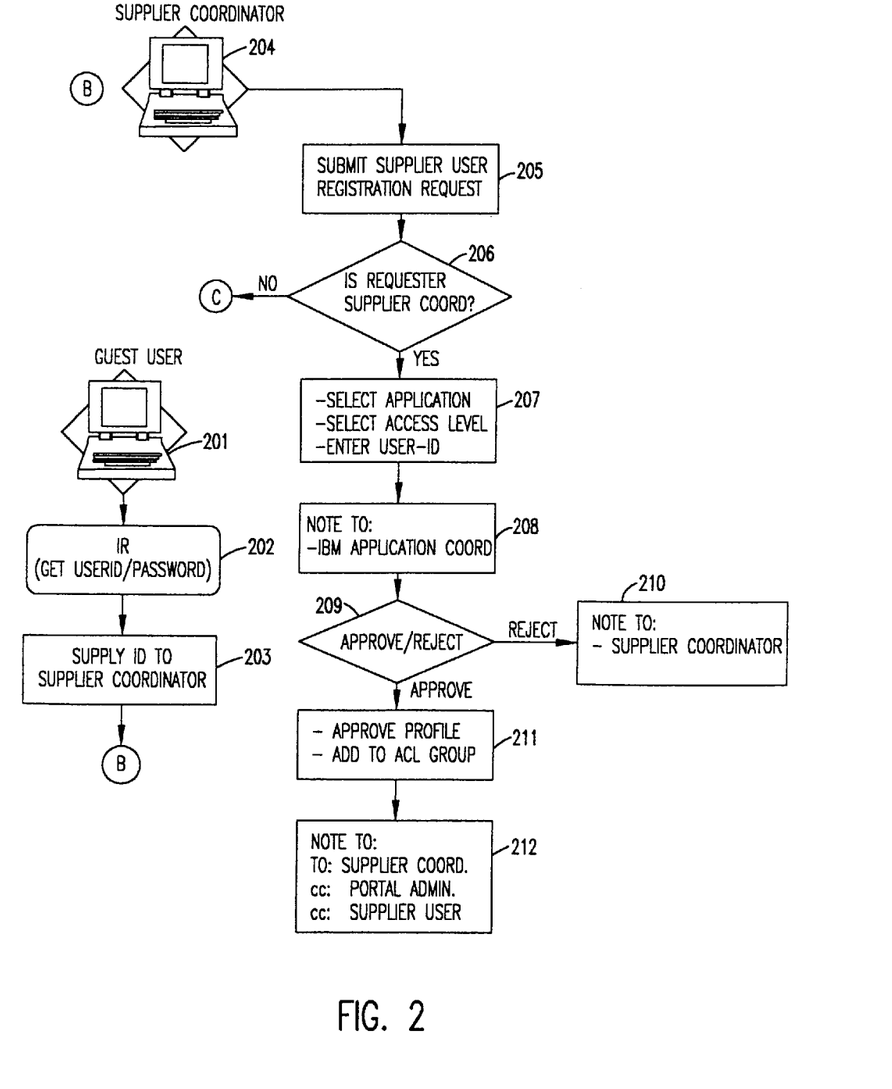
FIG. 2 is a flow diagram illustrating user registration initiated by a supplier coordinator.

FIG. 2 shows the flow of the supplier user registration process initiated by a supplier coordinator. The process begins on receipt of a guest user request at 201 and, in response to this request, the userid/password is obtained at 202. The userid/password is supplied to the supplier coordinator at 203. The supplier coordinator 204 submits a supplier user registration request in function block 205. Then, in decision block 206, a determination is made as to whether the requestor is a supplier coordinator. If not, the process goes to the process for user registration shown in FIG. 3 and described in more detail below; otherwise, the user selects an application, selects an access level and enters the userid/password in function block 207. An e-mail is sent to the application coordinator in function block 208, and then a determination is made in decision block 209 as to whether to approve or reject the request. If rejected, an e-mail note is sent to the supplier coordinator in function block 210. If approved, the user profile is approved and added to ACL group, if required, in function block 211. Finally, an e-mail note is sent to the supplier coordinator with copies to the Portal administrator and supplier user in function block 212.

Registration Request from the Supplier User

The supplier user will acquire a userid/password from Registration site and will use the PCR user interface to request access for an application. The user needs to provide necessary information, e.g., his/her userid (obtained from the Registration home page), the e-mail address, the company name, the access level, the name of the application the user requires access to, etc. The request will be forwarded to the application administrator. The application administrator will verify the company name. The request will now be forwarded to the supplier coordinator for approval/rejection supplier coordinator will perform the following tasks using the PCR user interface to register the supplier user:

1. Set up the authorization for the supplier user to access the application.
2. An automatic e-mail will be sent to the supplier user.

Figure 3:
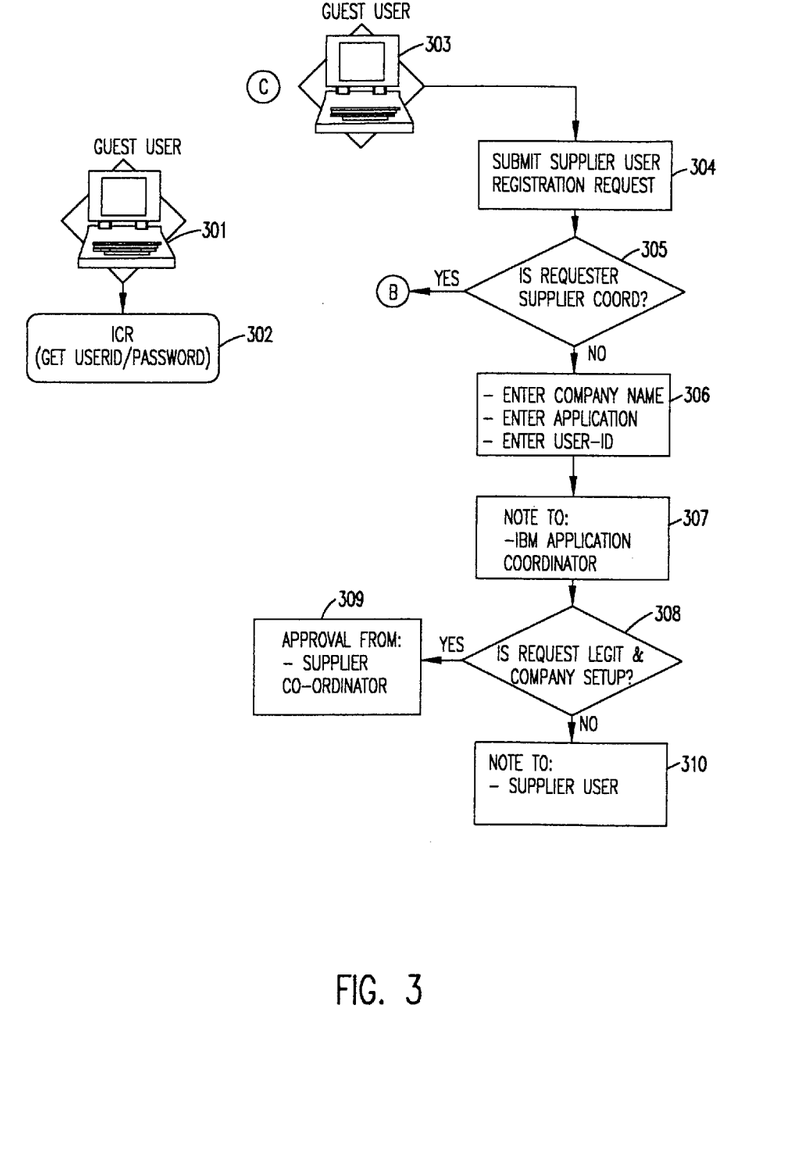
FIG. 3 is a flow diagram illustrating user registration initiated by a supplier (guest) user.

FIG. 3 shows the flow of supplier user registration process initiated by the user. The process begins with receipt of a request from a guest user at 301 and, in response to the guest user's request, the userid/password is obtained at 302. The process is also entered from the process of user registration initiated by a supplier coordinator shown in FIG. 2. In either case, the guest user 303 submits a supplier user request in function block 304. A determination is made in decision block 305 as to whether the requester is a supplier coordinator. If so, the process goes back to function block 205 of FIG. 2; otherwise, the guest user enters the company name, the application and its userid/password in function block 306. An e-mail note is sent to the application coordinator in function block 307, and then a determination is made in decision block 308 as to whether the request is legitimate and the company is set up. If so, approval is obtained from the supplier coordinator in function block 309; otherwise, an e-mail note is sent to the supplier coordinator in function block 310.

Figure 4:
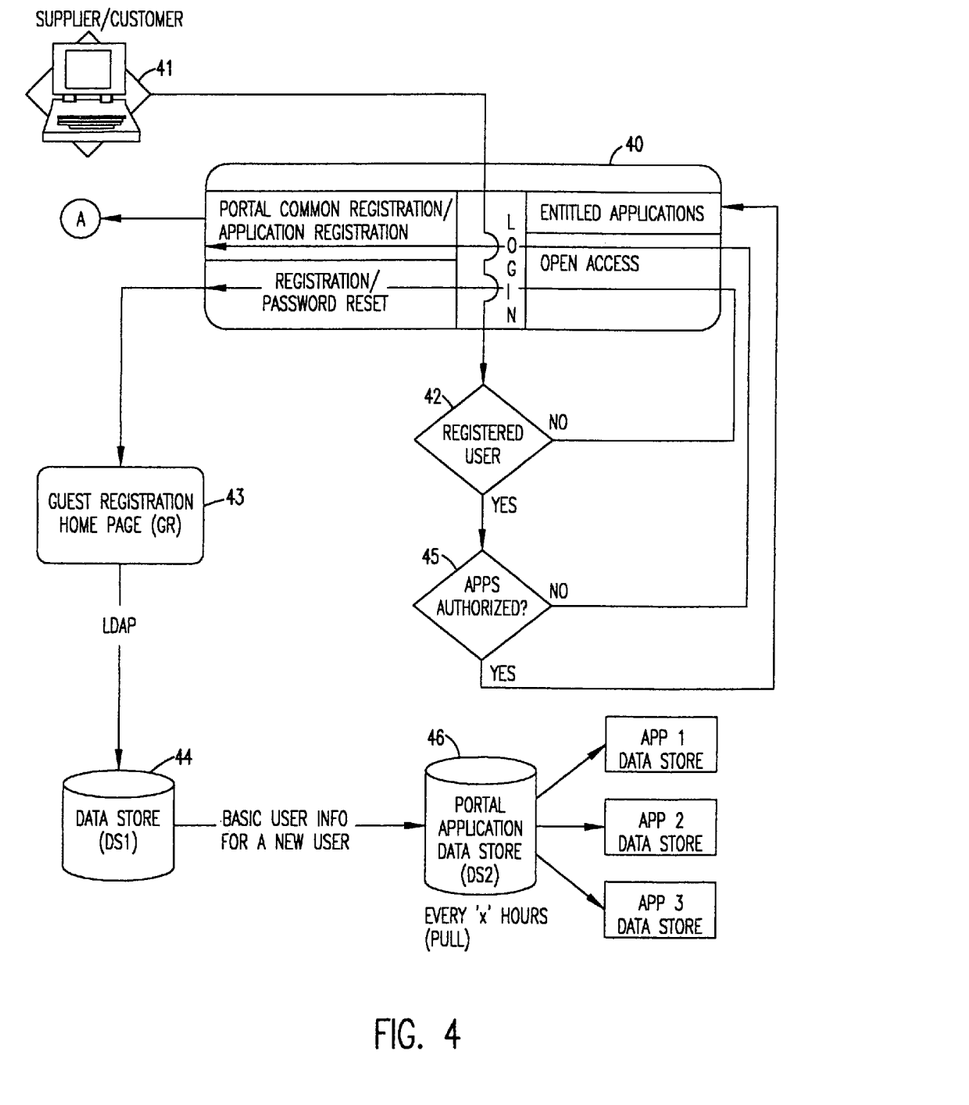
FIG. 4 is a block diagram showing the data flow of the supplier portal architecture according to the invention.

FIG. 4 shows an overview of the supplier portal architecture. From the Supplier Portal 40, new guests 41 indicate using the Graphical User Interface (GUI) of the Supplier Portal Web page whether they are a registered user or not. If not a registered user, as determined in decision block 42, the guest selects Register to link to Guest Registration (GR) 43, where they can obtain a Web userid/password that enables them to register for any of the Global Procurement applications available under the Supplier Portal 40. Guest Registration (GR) 43 is an application which must be used by a Web user (i.e., customer, supplier or business partner) to access any internet/extranet application available through the Supplier Portal 40.

When a guest obtains a Web userid/password in GR 43, the guest information is stored in a GR data store 44. Although registered, a determination must be made, as indicated in decision block 45, as to whether any applications have been authorized for this guest. If not, the guest can then register for restricted applications in Portal Common Registration PCR (shown in FIG. 5), where information is stored in the Portal Common Registration (PCR) data store 46 throughout an application's approval cycle.

Figure 5:
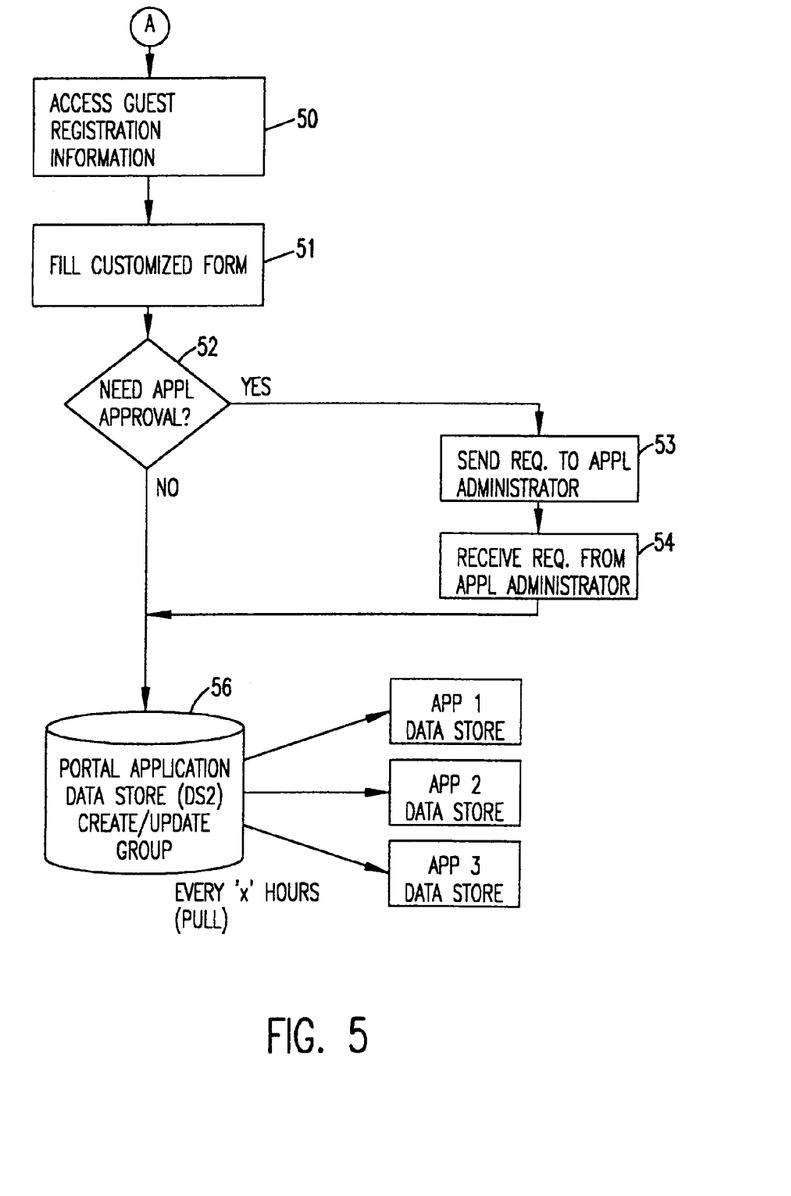
FIG. 5 is a block diagram showing the data flow of the PCR application registration according to the invention.

The Portal Common Registration process is shown in FIG. 5. From the Supplier Portal 40, information is accessed in function block 50 from the GR data store 14 which is used by the PCR to automatically build a customized home page in function block 51. This home page is modified and updated as the guest's requests for access to applications get approved. A determination is made in decision block 52 as to whether approval is needed for a requested application. If so, a request for approval is sent to the application administrator in function block 53, and the response from the application administrator is received in function block 54. The PCR data store 56 stores links to all applications for which the guest is approved, and this is reflected in the personalized Supplier Portal home page which displays a list of links to all of the applications for which that particular guest has been registered and authorized, therein enhancing east of use for guests needing to access Global Procurement restricted applications.

Returning now to FIG. 4, registered guests can invoke any of their approved applications by simply clicking the link to the desired application. As long as the applications are in the same realm, guests only need to provide their userid/password once during the entire session. When logging in at the Supplier Portal the guest is prompted for a userid/password, which was obtained from GR 43. Guests who have not yet obtained a userid/password can link directly to GR 43. The userid/password entered is authenticated against data stored in GR data store 44, then the Supplier Portal keys on granted-access information stored in the PCR data store 46 to display the guest's personalized Supplier Portal home page.

Before an individual guest can register for a restricted application, both the guest's company and a guest coordinator within that company must be predefined and registered for the application. All application registration is accomplished through the graphical user interface (GUI) of the Portal Common Registration (PCR). Guests link to the PCR's GUI from the Supplier Portal home page. The PCR Data store 46 stores user profiles, company profiles, access level definitions and application-specific information.

The Supplier Portal 40 is a dynamic site where application-specific attributes can be added by each host application administrator. For example, guests who apply for access to a restricted application will be presented with a customized application-specific registration form. All applications under the Supplier Portal must be enhanced or modified to use GR 43 for authentication and the PCR data store 46 to store application specifics needed.

The Supplier Portal 40 may be hosted in Intranet and intranet domains. In the preferred embodiment, both the Internet and intranet versions of the Supplier Portal will use an Apache-based Web server.

Summarizing, guests will use the Supplier Portal 40 to:
1. obtain a userid and password at GR 43 by selecting Register;
2. then register to access restricted Procurement applications by selecting Login, selecting Add a new user, selecting the application for which they want to register, then completing the New User Enrollment form; and
3. thereafter to:
   a. log in to the restricted applications by selecting Login, entering the user name and password, then selecting the desired application,
   b. navigate between these applications and/or open-access applications, and
   c. perform tasks the user's role has been authorized to perform, e.g., request access to another application, change user profile, view report, etc.

Guest Registration (GR) 43 is a self-registration application that must be used by any Web guest, supplier and business partner before access to any Internet/extranet application can be requested. The GR Web site is where first time guests obtain the Web userid/password that will enable them to use the PCR GUI in the Supplier Portal to register for Procurement Web-access applications. Guests can access GR 43 (1) linking to GR 43 from the Supplier Portal 40 at its universal resource locator (URL) or (2) going directly to the GR site at its URL. Guests accessing the GR home page will find these five different tasks they can choose from:

1. Register for the first time;
2. Change your personal information (your profile) after you have registered;
3. Change your password;
4. Request a new password if you have forgotten your old one; and
5. Request help if you have forgotten your userid or are having problems with your user account.

From the GR home page, guests begin by clicking Register or Register for the first time. After selecting a country, the Register page appears where they enter personal information such as name, address, phone number, e-mail address and finally their userid, password and a unique challenge question and answer.

From the Supplier Portal home page, guests can use public access applications by clicking the application name under the Applications heading, or restricted applications by clicking Login then entering their userid and password. The userid and password entered are authenticated against the LDAP directory in GR 43, then the guest's personalized Supplier Portal home page is displayed. The guest can then access the restricted application they need by simply clicking on its link. To access another restricted application through the Supplier Portal 40, the guest just returns to the Supplier Portal home page and clicks the link to the next available application.

In the event that a guest has bookmarked an application then later uses that bookmark to access the application directly, bypassing the Supplier Portal 40, the application will challenge the guest to enter a userid/password before allowing access. The authentication will be done from GR 43 by LDAP. The guest can then return to the Supplier Portal home page or use bookmarks to access other authorized applications. The guest will not be prompted to reenter the Web userid/password if the application is hosted under the same realm. If required, applications can be designed to only allow access to the users coming form the Supply Portal. If the user is accessing the application from a URL other than the Portal's, the user can be sent back to the Supply Portal home page.

All application registration is accomplished through the PCR GUI. The PCR GUI is designed to provide the flexibility and scalability to handle a large volume of transactions. Guests link to the PCR's GUI directly from the Supplier Portal 40 when they click Login from the navigator. The PCR data store 46 is the main storage for information such as user profiles, company profiles, access level definitions and application-specific information. The PCR data store 46 facilitates quick lookups of its data when required by applications.

Currently only authorized personnel can view and/or update the PCR data store 46. The authorized personnel will be defined by the application owner. Application-specific attributes can be tailored through PCR and the specific attributes will be stored in the PCR data store 46 for use by the application.

Requests for access to restricted applications are created with the PCR GUI. The request is loaded into a PCR data store table for temporary records, which triggers the approval cycle for the application. When the approval cycle is complete, the request record is migrated to the appropriate production table. General guest users may update their personal information through the PCR GUI. Certain administrators, coordinators and select others can retrieve data from the PCR data store 46, keying on the key fields using the PCR GUI.

Each restricted application under the Supplier Portal 40 will present a guest requesting access at the PCR GUI with a registration form that is customized for that application. The registration request is routed to the appropriate application administrator for approval. If approved, the guest profile is stored in the PCR data store 46 and the requester is notified of the approval.

For a registered guest, a personalized Supplier Portal home page provides links to each authorized application. Once logged in, a guest's level of access to an application is defined and controlled by the application's owner. The application access control level is captured and stored in the PCR data store 46. All types of attribute information can be extracted to synchronize the application's local store with the PCR data store 46, if necessary.

Before an individual guest can register for an application, the guest's company must be preregistered for the application and someone within the company must be designated as the company's guest coordinator and registered. It is not necessary to first define a guest coordinator from a supplier. A supplier user can be registered even if no guest coordinator has been defined. An external company must have at least one guest coordinator, but the Supplier Portal's architecture can support multiple guest coordinators. There are several possible ways application registration can be requested for an external guest coordinator and a guest at the PCR user interface. In each case, the person who needs to be registered for the application must have obtained a userid/password from GR. Here are the scenarios for requesting application registration for an external guest coordinator and for a guest.

Registration request from the host application administrator

Registration request from the prospective guest coordinator 0

Registration request from an already registered guest coordinator

Registration request from the guest user

Registration requests from the host user

The purpose of the PCR data store 46 is to store a set of common data to be shared by all applications, as well as unique data specific to a single application. The GR LDAP directory contains no application-specific data, only user data. When obtaining a userid/password in GR 43, guests enter pertinent information such as name, address, phone number, e-mail address, userid/password and challenge question and answer. This user data is stored in the GR LDAP directory. The individual applications under the Supplier Portal 40 may require much more application-specific data such as a guest's access privileges, company information and other supporting information. This is the type of information that is stored only in the PCR data store 46.

The PCR data store 46 in one specific implementation is comprised of approximately twenty tables, or entities. The PCR data store 46 stores data such as:

Common organization (company) profile, such as the organization headquarters address and Dunn & Bradstreet (D&B) Number. This type of information is common to all of the Supplier Portal applications.

Common user profile, such as the user's mailing address, e-mail address, phone number and facsimile number. This type of information is common to all of the Supplier Portal applications.

Applications that a company and its employees are authorized to access.

Application-specific user information that is not common to all applications.

Application-specific company related information that is not common to all applications.

Request approval cycle information for each application under the Supplier Portal, such as registration request status, who can approve what type of request, how many levels of approval are required, and what functions can be performed for a given guest.

Definition of user roles, both common to all Supplier Portal applications and application-specific.

Mapping of user roles and the functions associated with those roles.

PCR application configuration data.

Applications will communicate with the PCR data store 46 periodically to obtain information needed for use in the application. What data is needed and how it will be used depends on the architecture of the individual application. An application may choose to store its profile information in its own local repository, or to store the profiles solely in PCR data store 46.

Procurement application owners must perform some tasks, provide some resources and make some enhancements to successfully integrate their Web applications with the Supplier Portal 40. These are the tasks, resources, and application enhancements that are required:
1. Enable authentication with the GR LDAP directory
2. Provide an application administrator
3. Choose and enable appropriate tools to interface with
4. Extract data from the PCR databases (Note that it is possible for an application to dynamically access data from the PCR database.)
5. Migrate userids and applications These application integration requirements are discussed in the following pages.

Each application owner must decide what tool to use as an interface from which to communicate with the data store. Any interface can be used, for example, Domino Notes Pump, DB2 Client, Net.Data and ODBC (Open DataBase Connectivity). The driver within the tool must be enabled in order to allow communication with the data store.

Applications under the Supplier Portal 40 may need to extract application-specific keywords from the PCR data store. The host application administrator and the Supplier Portal development team work together to define what data is needed from the PCR data store and enable the application to extract that data.

The host application administrator must first provide the Supplier Portal development team with a list of application specifics that will be needed by the application. The Supplier Portal developers then add these specifics to the Supplier Portal design, storing them in the database schema. Once stored in the PCR data store 46, the application owner can extract the data needed using an appropriate interface tool and store it in the local repository, if any. If there is no local repository, an application can build a read only interface and link to the PCR data store 46 to obtain information needed for use in the application.

Certain administrators, coordinators and select others can use a read only query to extract private data from the PCR data store 46. These individuals will also have the ability to update the data store 46.

Each application under the Supplier Portal 40 may continue to maintain within the application its own local repository for application-specific profile data. The application owner needs to modify the application to point to PCR's data store 46 and extract the appropriate application-specific data needed to prefill the existing local repository database. The application developers must build an agent to pull application-specific data from the PCR data store 46 to synchronize the local data with the PCR data store data.

Application-specific profile data for an application not retaining its own local repository will be stored solely in the PCR data store 46. Adequate control of access to the application will require real time communication between the application and the PCR data store 46. Therefore, application developers must use an appropriate database interface to create a read only query to pull data from the PCR data store 46 as frequently as possible.

While the invention has been described in terms of a single preferred embodiment, those skilled in the art will recognize that the invention can be practiced with modification within the spirit and scope of the appended claims.

The invention claimed is:

1. A process for managing business, technical and operational data which uses a single interface in a shared space environment over the Internet comprising the steps of:
providing a supplier portal from which new guests indicate, using a Graphical User Interface (GUI) of the supplier portal Web page, whether they are a registered user or not;
determining whether a guest is a registered user from input by the guest, and if not a registered user, prompting the guest to select "Register" to link to guest registration (GR) where they can obtain a Web userid/password that enables them to obtain user-level registration for any of global procurement applications available under the supplier portal;
when a guest obtains a Web userid/password in GR, storing guest information in a GR data store;
determining whether any applications have been authorized for a registered guest and, if not, prompting the guest to register for restricted applications in a portal common registration (PCR) where information is stored in a PCR data store throughout an application's approval cycle;
accessing information from the GR data store to automatically build a customized home page for the guest, this home page being modified and updated as the guest's requests for access to applications get approved;
determining whether approval is needed for a requested application and, if so, sending by email a request for approval to the application administrator and receiving a response from the application administrator;
storing links to all applications for which the guest is approved, these links being reflected in the personalized supplier portal home page which displays a list of links to all of the applications for which the guest has been registered and authorized;
defining 1 to n level approval cycles a user must go through to get authorized to access an application;
logging in by a registered guest by inputting the guest's userid/password once for each session, as long as applications requested by the guest are in a same realm; and
invoking by a logged in guest any of their approved applications by simply clicking the link to the desired application in the guest's customized home page.

2. The process for managing business, technical and operational data as recited in claim 1, wherein the approval cycles are customizable for each application.

3. The process for managing business, technical and operational data as recited in claim 1, wherein the approval cycles are defined for a section of an application, providing a finer level of access control.

4. The process for managing business, technical and operational data as recited in claim 1, wherein application specific registration fields are defined so that a registration form, unique to an application, is displayed when a user requests access to an application.

5. The process for managing business, technical and operational data as recited in claim 1, wherein guests may bookmark applications for later access, further comprising the step of prompting by an application a guest to enter their userid/password for authentication against data stored in the GR data store when the application is accessed using a bookmark.

6. A data processing system for managing business, technical and operational data which uses a single interface in a shared space environment over the Internet comprising the steps of:

provide a supplier portal from which new guests indicate, using a Graphical User Interface (GUI) of the supplier portal Web page, whether they are a registered user or not;

means for determining whether a guest is a registered user from input by the guest, and if not a registered user, prompting the guest to select "Register" to link to guest registration (GR) where they can obtain a Web userid/password that enables them to obtain user-level registration for any of global procurement applications available under the supplier portal;

a GR data store storing guest information when a guest obtains a Web userid/password;

a portal common registration (PCR) wherein information is stored in a PCR data store throughout an application's approval cycle;

means for determining whether any applications have been authorized for a registered guest and, if not, prompting the guest to register for restricted applications in the PCR;

means for accessing information from the GR data store to automatically build a customized home page for the guest, this home page being modified and updated as the guest's requests for access to applications get approved;

means for determining whether approval is needed for a requested application and, if so, sending by email a request for approval to the application administrator and receiving a response from the application administrator;

means for storing links to all applications for which the guest is approved, these links being reflected in the personalized supplier portal home page which displays a list of links to all of the applications for which the guest has been registered and authorized;

means for defining 1 to n level approval cycles a user must go through to get authorized to access an application;

means for logging in by a registered guest by inputting the guest's userid/password once for each session, as long as applications requested by the guest are in a same realm; and means for invoking by a logged in guest any of their approved applications by simply clicking the link to the desired application in the guest's customized home page.

* * * * *